United States Patent
Poiraud et al.

[19]

[11] Patent Number: 5,923,667
[45] Date of Patent: Jul. 13, 1999

[54] SYSTEM AND METHOD FOR CREATING N-TIMES BANDWIDTH FROM N SEPARATE PHYSICAL LINES

[75] Inventors: Clement Poiraud, Cagnes Sur Mer, France; Edward Suffern, Chapel Hill; Spiros Teleoglou, Raleigh, both of N.C.

[73] Assignee: International Business Machines Corporation, Armonk, N.Y.

[21] Appl. No.: 08/807,496

[22] Filed: Feb. 27, 1997

[30] Foreign Application Priority Data

Jun. 28, 1996 [EP] European Pat. Off. ............... 94680090

[51] Int. Cl.$^6$ ...................................................... H04J 3/06
[52] U.S. Cl. ........................... 370/515; 375/367; 370/535
[58] Field of Search ..................... 370/536, 535, 370/537, 539, 540, 542, 544, 503, 506, 509, 510, 511, 515, 512, 514, 516, 517, 518, 519, 484; 375/354, 359, 362, 365, 367, 366, 368, 371

[56] References Cited

U.S. PATENT DOCUMENTS

| | | | |
|---|---|---|---|
| 3,699,344 | 10/1972 | Rutz ......................................... | 370/515 |
| 3,952,162 | 4/1976 | Texier et al. ............................. | 370/515 |
| 5,065,396 | 11/1991 | Castellano et al. ...................... | 370/536 |
| 5,123,100 | 6/1992 | Hisada et al. ............................ | 370/519 |
| 5,251,210 | 10/1993 | Mann et al. .............................. | 370/519 |
| 5,333,132 | 7/1994 | Chuniaud et al. . | |

OTHER PUBLICATIONS

CCITT H.221 "Frame Structure for a 64 to 1920 kbit/s Channel in Audio Visual Teleserivces" Geneva, 1990.

*Primary Examiner*—Huy D. Vu
*Attorney, Agent, or Firm*—Daniel E. McConnell; Morgan & Finnegan

[57] ABSTRACT

A method and system aggregate data on multiple physically separate lower-speed E1/J1 channels of a communications network to generate higher bandwidth. A high speed data stream is first divided into lower bandwidth channels and transmitted through the network. The data arrives with varying delays depending on the physical characteristics of the network. Low bandwidth channels are aggregated together into a high bandwidth channel by determining the different geographical delay parameters among the lower speed channels, adjusting the transmission delays by alignment circuitry, and then combining the lower speed signals into one high bandwidth channel for the user. The transmission delay adjustment consists in adding a pseudo-random noise pattern to each of the lower bandwidth channels, measuring the time difference among all the channels, and then adjusting the time differences in the received data stream so that the combination of the signals produces a coherent higher bandwidth data stream. Because of the enhanced delay compensation mechanism, there is virtually no distance limitation in the transmission of data and if one of the lower physical telecommunication lines becomes inoperative, bandwidth recovery is provided.

11 Claims, 12 Drawing Sheets

PROCESS OF DELAY EQUALIZATION

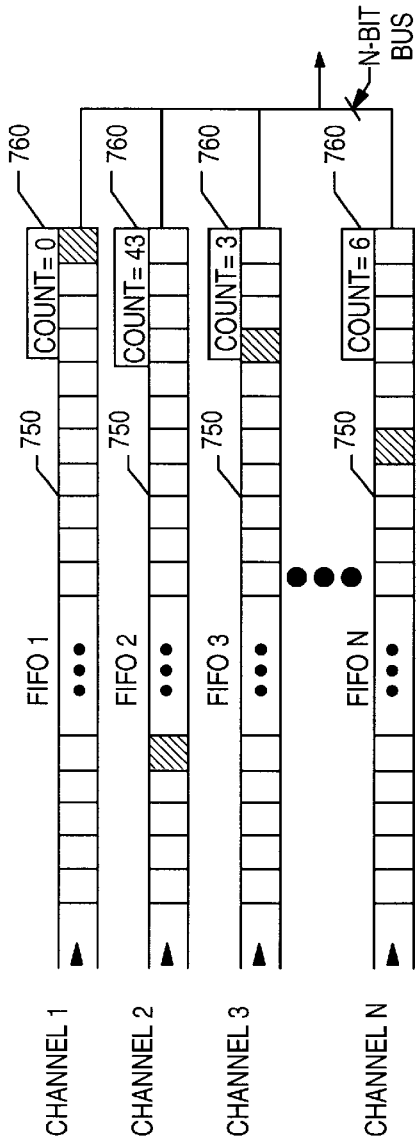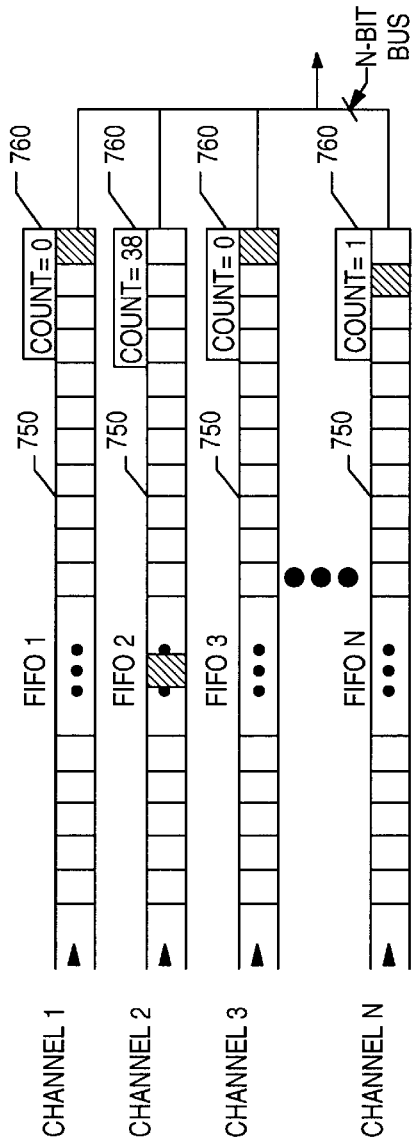
FIG. 9A
FIG. 9B
FIG. 9A

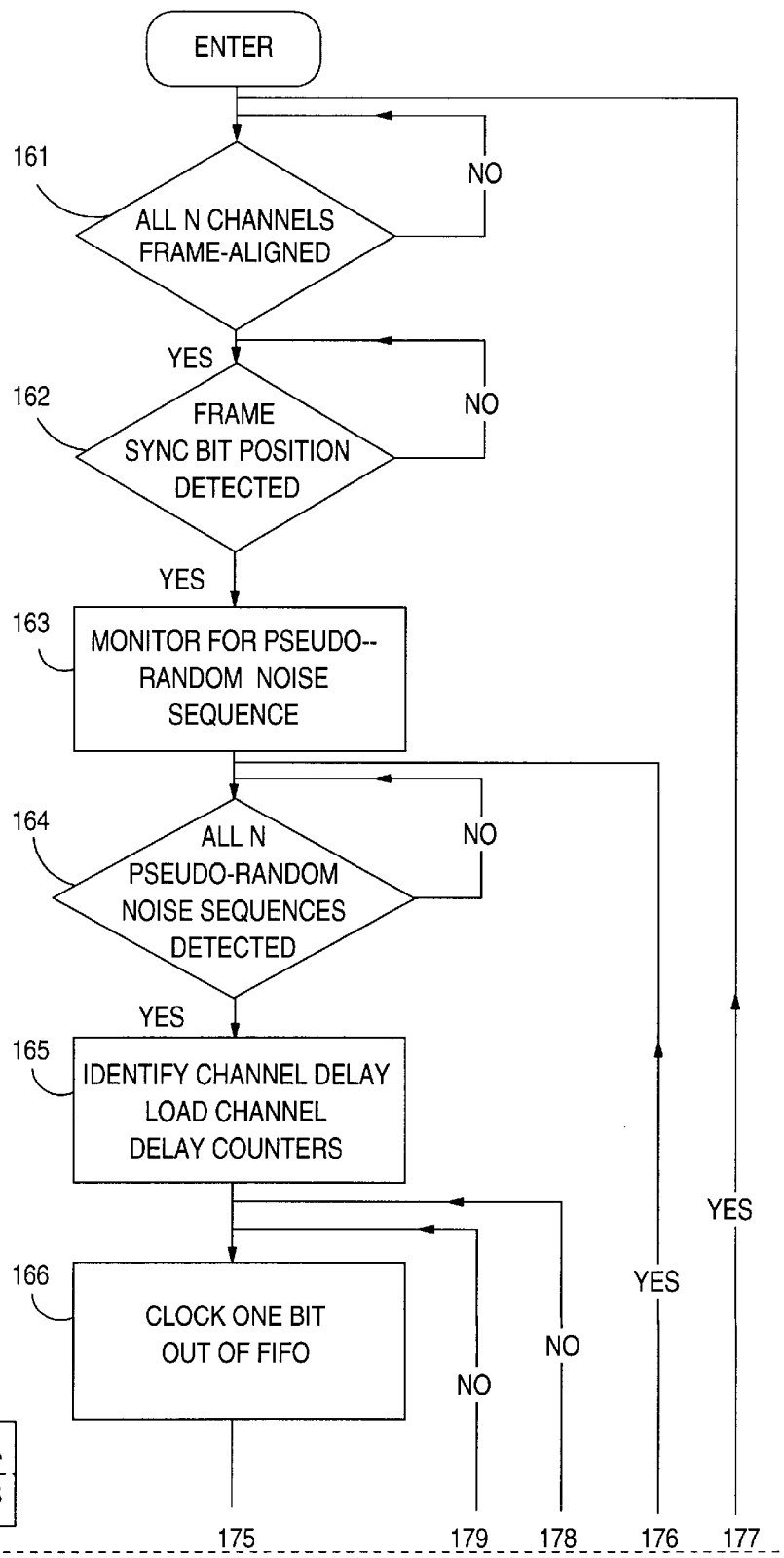

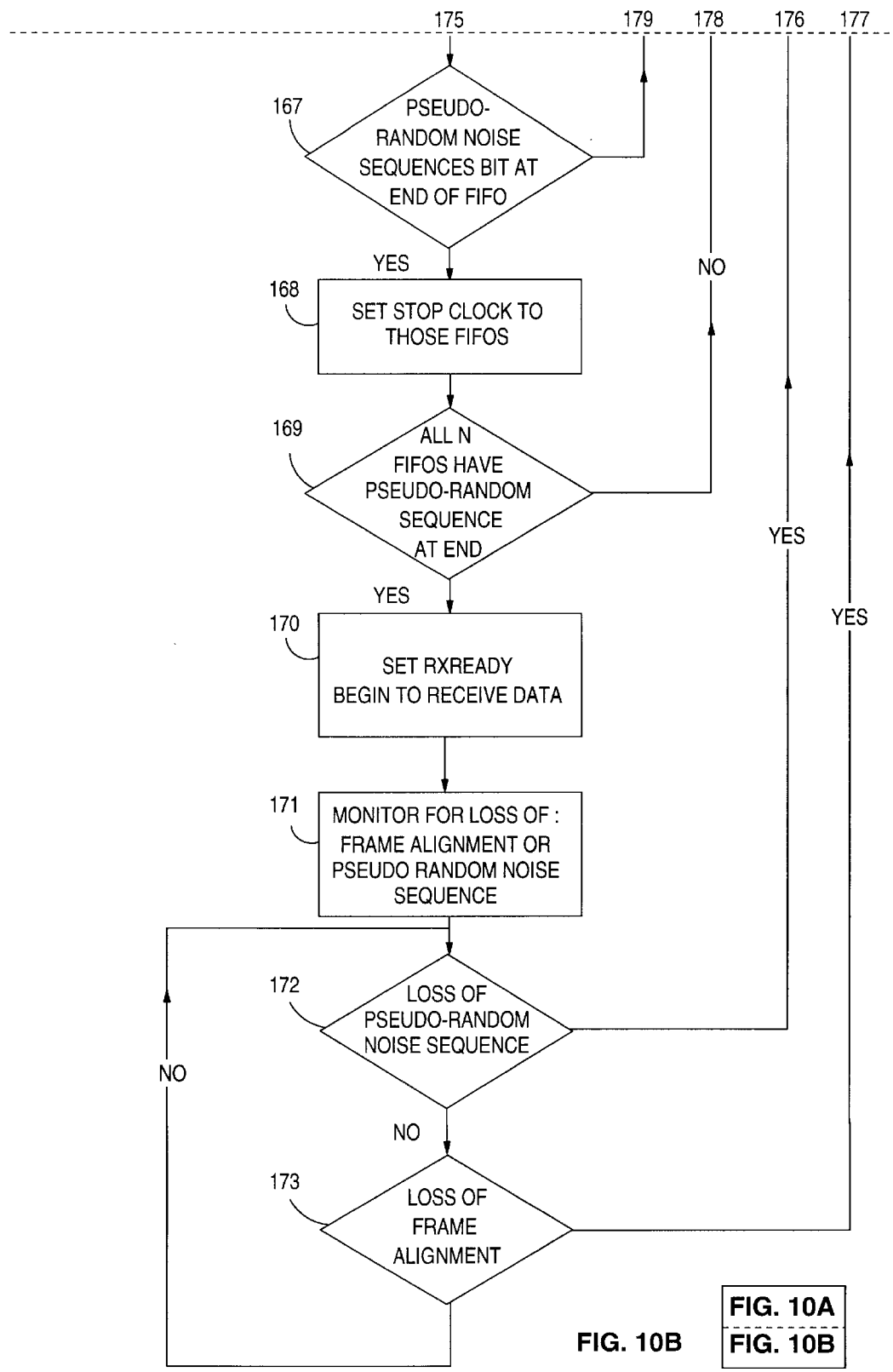

SYSTEM AND METHOD FOR CREATING N-TIMES BANDWIDTH FROM N SEPARATE PHYSICAL LINES

BACKGROUND OF THE INVENTION

(1) Technical Field

The present invention relates to high speed synchronous communication networks and more particularly to a system and a method for creating N-times bandwidth from N separate physical lines.

(2) Description of the Prior Art

The present communication carrier networks have evolved over time from data transmission using mostly analog techniques into entirely digital networks. New industry standards for the transmission and the reception of data have emerged including among other things, methods for channelization, data multiplexing and demultiplexing, switching and cross-connection routing of data from one user to another.

The CCITT Standards specify data signal voltage levels and template characteristics, framing formats, clocking and signal jitter characteristics. The Standards allow the different manufacturers to connect their equipment to the carrier networks and to inter-operate with each other. In the United States, the Standards have been, in particular, the object of a large number of US patents relative to clock recovery, alignment and synchronization within a single channel, as follows:

U.S. Pat. No. 4,394,758, "Timing circuits for PCM reception"—Donne et al.

U.S. Pat. No. 4,394,759, "Digital information transmission system"—Donne et al.

U.S. Pat. No. 4,417,348, "Digital channel protection switching for radio communications"—Abbruscato et al.

U.S. Pat. No. 4,458,356, "Carrier wave restoration circuit for receiver"—Toy et al.

U.S. Pat. No. 4,630,286, "Multiple telephone circuit synchronizer for high speed data"—Betts et al.

U.S. Pat. No. 4,675,886, "Frame synchronizing unit with word-locking decoder"—Surie et al.

U.S. Pat. No. 4,734,920, "High speed modem for multiple communication"—Betts et al.

U.S. Pat. No. 4,744,095, "Diversity channel switch with automatic data rephasing"—Cornet et al.

U.S. Pat. No. 4,775,987, "Transmitter for high bit rate data over telephone system"—Miller et al.

U.S. Pat. No. 4,818,995, "Parallel transmission system using step as line coding type"—Takasaki et al.

Standardization, while useful, is sometimes not cost effective because the granularity of bandwidth to the user does not always meet his needs. The user must reserve bandwidth in the increments tariffed by the individual countries. In Europe and Japan bandwidth is available on E1 and J1 lines, respectively, while in North America bandwidth is available on T1 lines which are the equivalent of E1/J1 lines. See "Newton's Telecon Dictionary" by Harry Newton, Flat Iron Publishing Inc., New York, 8th Edition, published November 1994. If a higher bandwidth is required than provided by a given type of channel, the user is forced to buy the next higher increment of bandwidth even though the tariffed bandwidth far exceeds requirement. For example, in Europe, a user requiring more than the E1 bandwidth of 2 Mbps is forced to buy E3 bandwidth of 34 Mbps. Intermediate rates of bandwidth are not available and the user must buy more bandwidth than required, wasting useful network resources. For purposes of description hereinafter, the term E1/J1 lines shall include T1 lines or equivalent in North America, as indicated in Table 1, supra.

Users in all countries would like to use 2, 3, 4, or more channels, and aggregate them as a single channel rather than pay for a high-speed line with low line utilization most of the time. What prevents the users from doing this directly is that each is individually routed, and may traverse a different geographic path through the network. Thus, the individual control signals experience different transport delay times in passing from the source terminal to the destination terminal. Therefore, the receiving end is not able to reassemble the information in the correct sequence.

Prior art related to the forgoing problem is described in U.S. Pat. No. 5,251,210 entitled "Method and Apparatus for Transforming Low Bandwidth Telecommunications Channels into a High Bandwidth Telecommunication Channel"—Mann et al.—The '210 patent discloses a method for combining lower bandwidth channels to produce a higher bandwidth channel. However, this disclosure is limited in scope because:

1. Application field is limited to the United States telecommunications environment.
2. Delay is not correctly compensated over 5000 meters and limits the transmission distance.
3. No error recovery is provided if one of the lower bandwidth channels becomes inoperative.

SUMMARY OF THE INVENTION

It is therefore the object of the present invention to provide a method and system for creating a N-times bandwidth from N separate physical telecommunication lines in a communication network.

Another object is equalizing transmission delay among a plurality of channels combined into a high speed channel.

Another is determining the different transmission delays among a plurality of channels combined into a high speed channel.

Another is a special alignment signal for each channel combined into a high speed channel.

Another object is a system and method for aligning a plurality of channels combined into a single channel without corruption of data.

Another object is a system and method for providing bandwidth recovery when a channel becomes inoperative.

These and other objects, features, and advantages are achieved in a communication network in which a high bandwidth data stream which is a multiple of the E1/J1 bandwidth is separated into N separate physical data streams connected to the transmission network. Data are transmitted over different physical paths and are received with different delays among the N E1/J1 lines. The different delay characteristics of the different physical lines are taken into account. The end user transmitting and receiving the data, believes full N-times E1/J1 bandwidth is available.

In the case of E1/J1 lines, the alignment of lower speed E1/J1 data into a higher bandwidth operates by using some of the bandwidth of each E1/J1 channel as a common timing signal. Each E1/J1 signal is transmitted to the network with identical timing information. At the destination, the timing information is recovered for each E1/J1 signal independently and is used to recombine the low bandwidth signals into a single high bandwidth signal. The term for this process is to cohere the output from the network into a high bandwidth signal. The timing information is a "superframe" signal added into one bit position of each E1/J1 frame. The effective bit rate of each constituent E1 link is thus reduced from 1984 to 1976 kbps, 8 kbps being reserved for the timing information. The bit rate of N cohered E1 links is N×1976 kbps. The J1 bit rate is reduced to 1536 kbps from 1544 kbps. The "superframe" signal is a pseudo-random noise sequence from a shift register generator. The auto-correlation properties of pseudo-random noise sequences make them ideal for such timing purposes. The period of the pseudo-random noise sequence is set to at least twice the anticipated delay differential. The factor of two is needed to prevent delay "aliasing". Aliasing is when the delay in one line is greater than that of the delay compensation mechanism. Aliasing results in one channel arriving one frame out of phase with the other channels causing a corruption of the received data because the receiver cannot detect entirely "skipped" frames. At the source, the same bit of the pseudo-random noise sequence is inserted on each E1/J1 line. The pseudo-random noise sequences inserted on each transmission line are used at the destination to align the data received from the network. At the destination, pseudo-random noise sequence receivers independently acquire the phase of the timing information in each E1/J1 signal. However, since separate physical paths are used for the transmission of the data, the data at the receiving end is not in the same data-bit sequence as the data that was transmitted at the source. The differential delays between the E1/J1 channels can be resolved by using the difference in superframe phases. This function can be accomplished because the transmitting end inserted the receive alignment signals in the same bit position relative to the superframe signals in the data stream (Superframe signals are used by the network to ensure that all user data remains in the same relative time position to a common reference point i.e. the superframe signal.). The process of determining the relative time position of user data to a common reference point and then compensating for this time difference is called coherence throughout in this application. Based on the measured time differences between the superframe signal and the pseudo-random noise bit in the data stream, the relative delay across all the channels can be determined. The system compensates for the individual delay variance and combines the low-bandwidth channels' receive data effectively as a single high bandwidth channel.

BRIEF DESCRIPTION OF THE DRAWINGS

The invention will be better understood from a detailed description of a preferred embodiment taking in conjunction with the following Figures, in which:

FIGS. 9a and 9b are timing diagrams for the delay equalization process of FIG. 8, after two, seven and forty five clock pulses;

FIGS 10a and 10b are flow diagrams for the receive reassembling process of FIG. 7.

DESCRIPTION OF THE PREFERRED EMBODIMENT

Telecommunications Multiplexor Hierarchy

The hierarchy of multiplexors used in different parts of the world is shown below in Table 1 and the different multiplexing techniques can be used within one another:

TABLE 1

PCM Hierarchies

| Order | North American | | Japanese | | CCITT CEPT | |
|---|---|---|---|---|---|---|
| | Bit Rate Mbps | No of Channel | Bit Rate Mbps | No of Channel | Bit Rate Mbps | No of Channel |
| Single Channel | 64 kbps | 1 | 64 kbps | 1 | 64 kbps | 1 |
| First order | 1.544 | 24 | 1.544 | 24 | 2.048 | 30 |
| Second order | 6.312 | 96 | 6.312 | 96 | 8.448 | 120 |
| Third Order | 44.736 | 672 | 32.064 | 480 | 34.368 | 480 |
| Fourth Order | 274.176 | 4032 | 97.728 | 1440 | 139.274 | 1920 |
| Fifth order | | | 397.200 | 5760 | 564.992 | 7680 |

Figure 1:
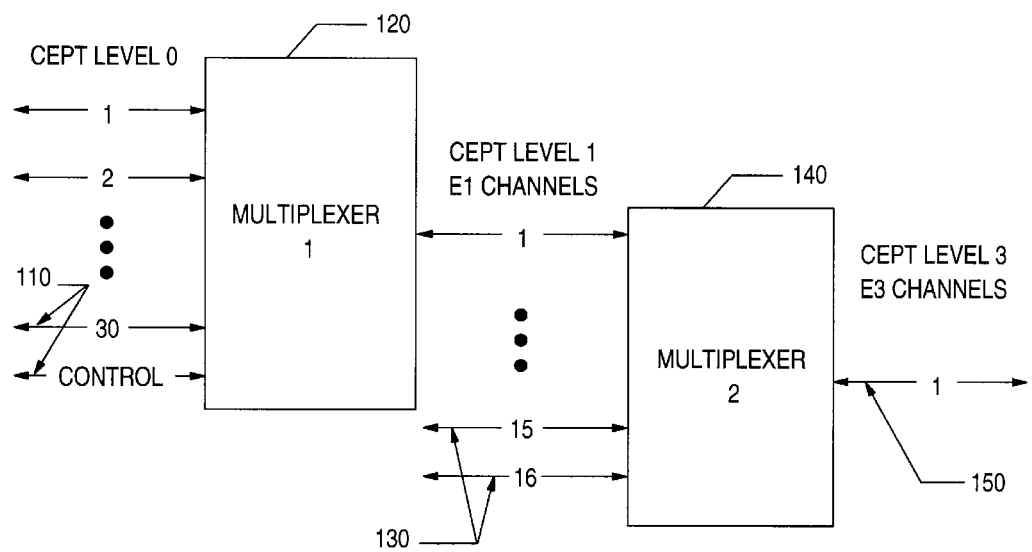
FIG. 1 is a block diagram of a typical telecommunications network hierarchy through out the world.

FIG. 1 depicts a typical use of multiplexors in cascade. A number of low speed 64 kbps channels 110 are combined by a carrier's multiplexor 120 into one high speed E1 line 130 operating at 2048 kbps. This includes 1920 kbps of user data and 64 kbps of network signalling information required in the network standard. The remaining 64 kbps is used by the network equipment for frame and superframe synchronization and for network management of the network. The resulting combination 130 comprises:

30 users channels 110 (30-times 64 kbps), and one control channel 110 used for signalling (64 kbps)

one network channel added by the network equipment multiplexer 140 used for frame synchronization (64 kbps).

The effective user bandwidth available is 1920 kbps. Added to these channels 110 is a control channel for signalling. The multiplexor 120 adds a network channel for allowing the telecommunications equipment to identify each channels' position within the E1 line. This bandwidth comprises the CEPT level 1 E1 channel 130 for the next level multiplex or 140.

Figure 4:
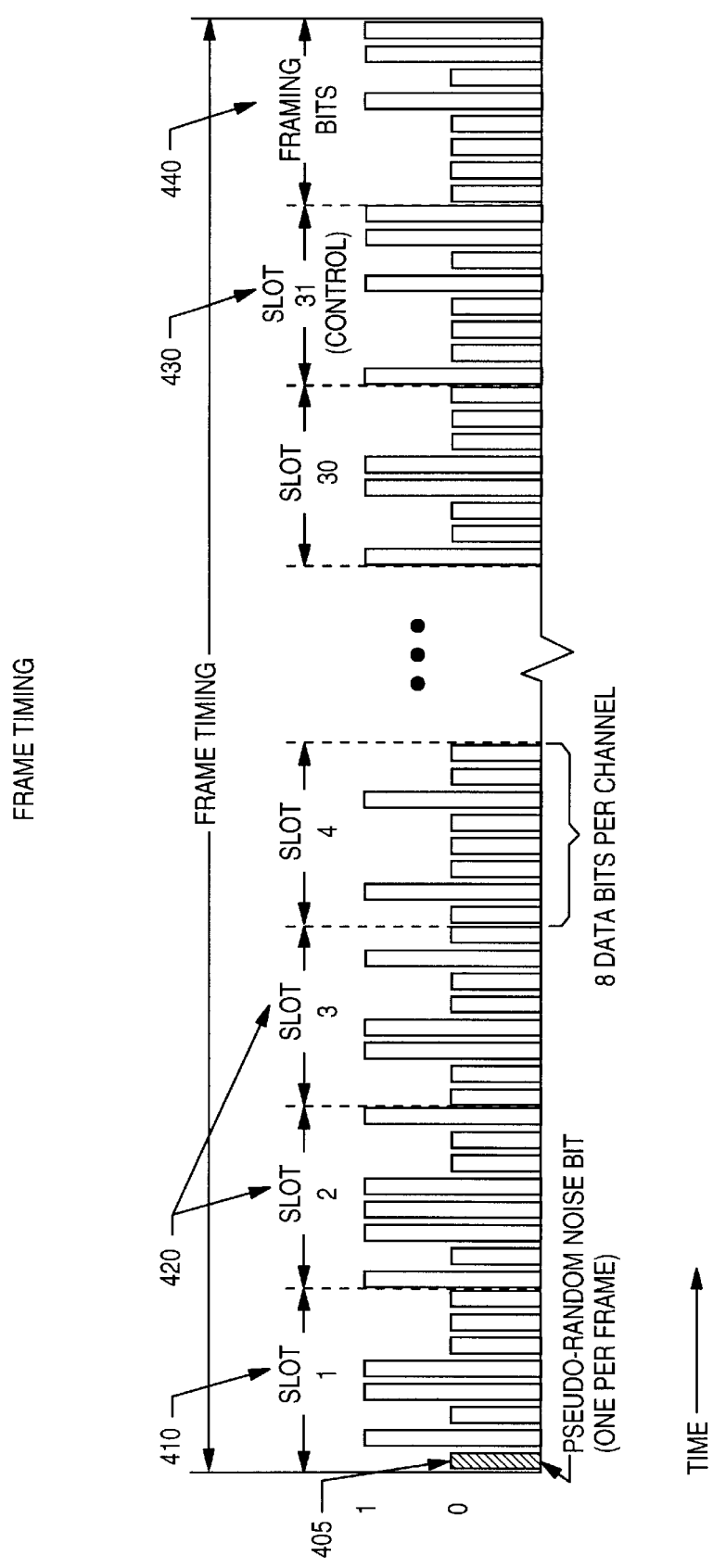
FIG. 4 is an E1/J1 frame structure according to the present invention.

FIG. 4 depicts the same scenario as related to a time sequence. The pattern of 256 bits transmitted in 125 microseconds is a repetitive pattern within the network resulting in a bandwidth of 2048 kbps. Data is divided into 30 eight-bit channels 410 and 420. The control channel 430 is reserved in the data stream for signalling purposes. The sum of 30 data channels and one signalling channel at 64 kbps is 1984 kbps. The network framing pattern 440 is added to each frame to allow the transmission equipment in the network to maintain frame synchronization and therefore know the relative position of each of the user's data within the frame. The addition of this information brings the total network bandwidth to 2048 kbps. Various types of combinations with varying amounts of user bandwidth are available within the network. This standard has been designated as the :f.H sub x:ef.-series standards for E1. The multiplexing 140 by the telecommunications carrier of sixteen E1 lines together 130 forms one E3 telecommunication connection 150 operating at 34368 kbps.

Bandwidth Granularity

The use of E1/J1 channels for transporting user data through the European and Japanese telephone networks is well-established. Many commercial products do this today. The limitation of this technology is that the maximum user bit rate available is only 1984 kbps; the E1 bit rate, less the framing overhead. Increasingly, there is a need for sending data at higher rates. The next step in the telephone hierarchy is E2 at 8448 Mbps. However, many countries do not offer this service so the only available tariffed service is E3 at 34368 Mbps. For customers requiring more bandwidth than the E1 bandwidth of 1984 kbps this is a very large increase in bandwidth and very expensive for the customer. It is only justified in very few instances and in many countries this speed is not tariffed. What is needed instead is a channel with a bit rate which is a low integer multiple of the E1/J1 bit rate. That is, use 2, 3, 4, or more physically separate and tariffed E1/J1 lines and aggregate them as a single line. What prevents from doing this directly is that each E1/J1 is individually routed, and may traverse a different geographic paths through the network. Thus, the individual E1/J1 signals experience different transport delay time in passing from the source terminal to the destination terminal.

Disassembling and Reassembling

Figure 2:
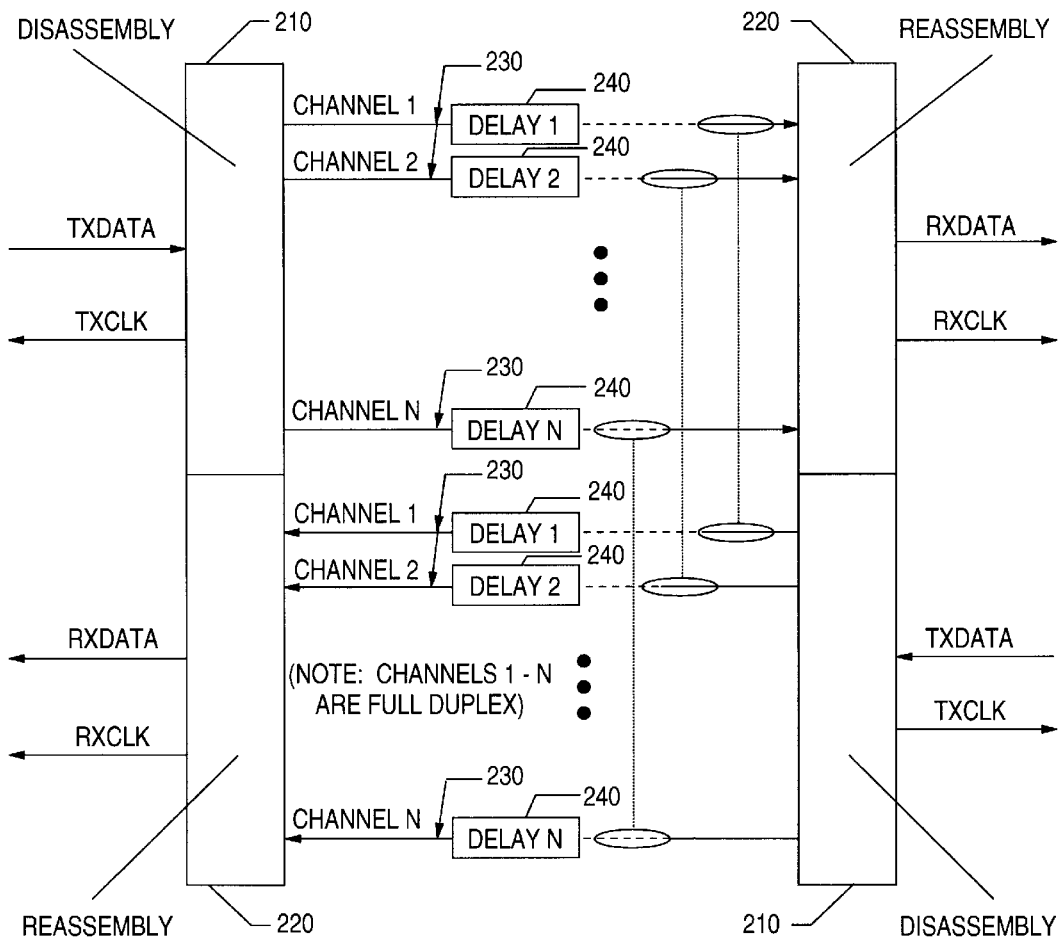
FIG. 2 is a block diagram of disassembling and reassembling apparatus included in the system of FIG. 1, according to the present invention.

Referring to FIG. 2, the system claimed in the present invention receives data from a single user at a rate N-times that of a E1 line 130. User data is transmitted to/from the invention 210 and 220 as full duplex data in the form of serial data streams labelled TxDATA and RxDATA. The data is accompanied by network clocks labelled TxCLK and RxCLK. Before being transmitted over the carrier network, this data is divided 210 into N lower speed serial data channels 230. After transmission, the data received from the multiple N channels 230 is reassembled 220 into a continuous data stream resulting in the reception of data identical to the data transmitted. The problem is that the lower speed channels 230 have different delay characteristics 240 because:

the channels are physically different;

the equipment along the transmission path are different;

the routes within the network are different.

An object of the present invention is to account for and to compensate for this time difference in the data transmission.

E1/J1 Frame Structure

As shown in FIG. 4, user data is placed in slots 1 to 30 420 of the E1/J1 frame. (All the slots can be used contiguously so the system has one single user occupying all the bandwidth available). The last slot 430 is used for framing and control purposes and the first (MSB) bit 405 of the first slot 410 of every frame is used at the receiving end to determine the delay characteristics of each physical link. Because the invention requires use of one bit of the user's data stream, the user's bandwidth is slightly less that the total available bandwidth. A data pattern is inserted in the bit at the transmitting end so that the receiving end can search the data stream and determine when the hardware has detected the data pattern in this bit position. Since user data is not random in nature (there are some bit patterns repeated more often than others) one must chose a bit pattern to insert in the MSB bit 405 that will not be confused with a data pattern. Data patterns simulating noise sequences are ideal for this purpose. Therefore, a pseudo-random sequence of length 511 (9 bits) as defined by "the CCITT $10e^{-15}$ pseudo-random noise pattern", is written into this timing bit 405. Exactly the same pseudo-random sequence bit 405 is written into this bit position for each N E1/J1 frame in the same group of telecommunication lines. This pattern is repeated each 511 bits. Since each frame is 125 usec, the pseudo-random noise sequence forms a super framing pattern of 511 frames (63⅞ msec-E1—511 times 125 usec) in length. User information is then placed in the remaining seven bits of the first channel 410 and also in the remaining channels 420. The user is unaware that one bit of his data stream is being used for determining the delay characteristics of the telecommunications line. The timing to the end user is adjusted to take this slight variance into account and no user data is lost.

The maximum delay differential that a pseudo random noise sequence mechanism can compensate for is up to one half of the length of the pattern's signal period. Otherwise, the data stream would be out of coherence by one frame length and go undetected by the hardware. The recovered data at the receiving end would no longer match the transmitted data and the invention would not function. The mechanism described coheres up to 31¹⁵⁄₁₆ msec for E1 lines (½ of 63⅞ msec). Compensation for delays longer than this would require pseudo-random sequences of longer lengths i.e. 1023 bits. Since the pseudo-random sequence detection hardware increases with respect to the pattern length, 511 bits was chosen as an optimal number for the following reason. Data is transmitted at the speed of light or :f.3×10 sup 8:ef. meters per second. With the invention able to cohere signals with different delays of up to 32 milliseconds, the data could travel approximately 10,000 kilometers without before this invention would fail to cohere the signals.

Cohering Mechanism

Figure 7:
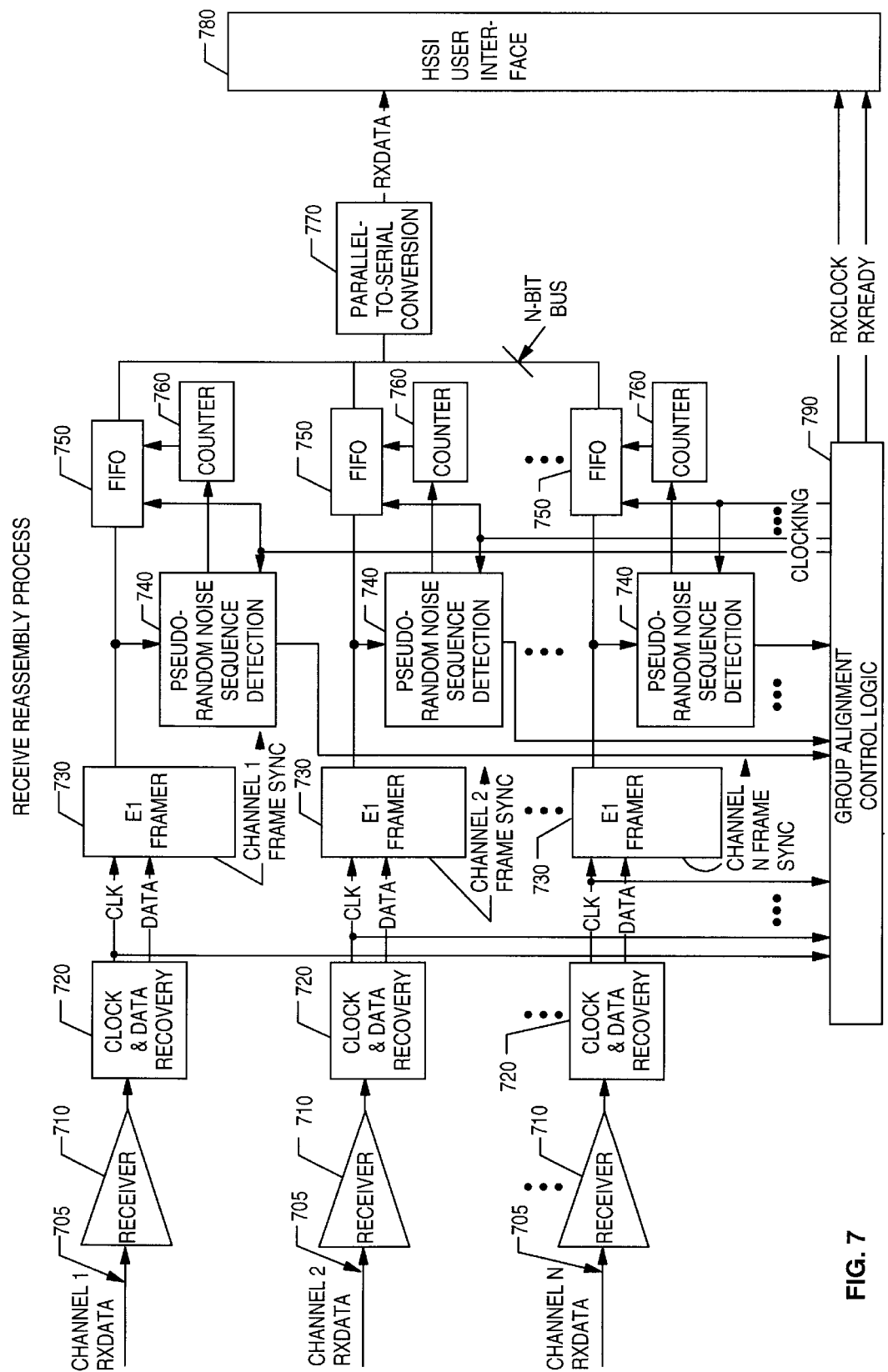
FIG. 7 is a block diagram of a receive reassembling system according to the present invention.

As illustrated in FIG. 7, the cohering mechanism at the receiving side requires, for each E1/J1 channel, the following devices:

an E1/J1 Framer 730 for detecting the network framing pattern associated with a Pseudo-Random Noise Sequence Detector 740 for determining the position of one E1/J1 data stream relative to another;

an Elastic Buffer (actual implementation uses a FIFO buffer) 750 for compensating the delay of the different paths used in the network.

The cohering mechanism contains a delay mechanism 32,768 bits in length (32 kbit FIFO commercially available). Each bit transmitted at 2048 kbits per second requires 488 nsec for transmission. This one bit is transmitted each 125 microseconds, the period for the framing structure to repeat itself at a transmission rate 2048 kbits per second. With one bit transmitted every frame and with a commercially available FIFO of 32,768 bits in length, a maximum frame delay of 40.6 milliseconds is possible. However, because this mechanism reliably compensates for half the FIFO delay, this allows for a maximum delay differential of 20.3 msec for E1 lines. At the start of the cohering operation, all N Pseudo-Random Noise Sequence Detectors 740 are searching for the pseudo-random noise sequence. During this time no data is loaded into the FIFO Buffers 750. Once the Pseudo-Random Noise Sequence Detectors 740 have detected the pseudo-random noise sequence (one pseudo-random noise bit from 511 consecutive frames), they are said to "lock" onto the pattern. Each E1/J1 channel locks onto their incoming pseudo-random noise sequences independently. After all N Pseudo-Random Noise Sequence Detectors 740 come in-lock, the differences in delays can be determined. Once the differences in delays are determined, the FIFO Buffer 750 can be used to compensate for this delay. Then the E1/J1 outputs can be cohered in the FIFO Buffer 750 into a single high bandwidth data stream.

Figure 3:
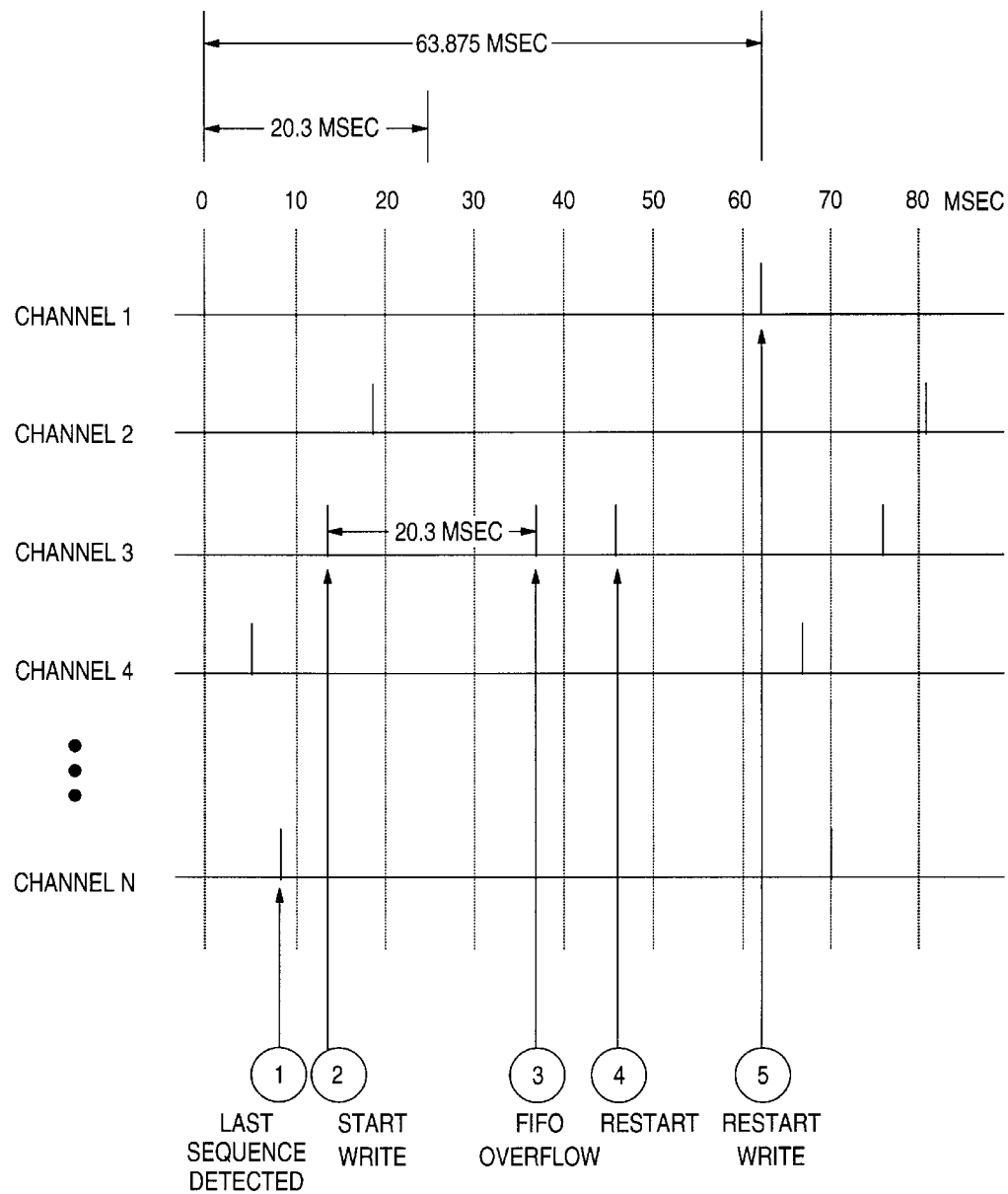
FIG. 3 is a timing diagram of a typical sequence of operation for starting the process of aligning data with different delay characteristics in FIG. 2. according to the present invention.

FIG. 3 shows a typical sequence of operations on starting coherence.

Last in-lock: there is no way to know what the absolute delay of the N incoming E1/J1 lines is. Hence the last pseudo-random noise codes to become in-lock is not, in general be that one having the longest delay (1) any of the N may be last.

Start Write: the FIFO Buffer 750 start when that particular channel has detected the 511 bits of the pseudo-random noise sequence. The write to the FIFO Buffer 750 might start with channel 3 (2), which is in the middle of the high bandwidth data stream. FIFO Buffer writes then starts for a channel 2, following its pseudo-random noise start of sequence bit.

FIFO Overflow: no more writes occur for over 20.3 msec. This causes the FIFO Buffer 750 of channel 3 (3) to overflow.

Reset upon the FIFO Buffer 750 overflow, all N FIFO Buffers 750 are reset (4). The window of 20.3 msec ensures that the other N-1 channel have had time to enter data bytes in the other FIFO Buffers 750 if proper coherence is occurring. The fact that they have not started to write indicates that proper coherence is not being obtained, and the mechanism resets. (Reset must be done from between 20.3 msec to 63.9 msec to ensure that it can been done and is removed before the start of the next pseudo-random noise sequence. The 20.3 msec figure is caused by the length of the FIFO Buffer of 32,768 bits and the 63.9 msec figure is caused by the number of bits in the pseudo-random noise sequence.)

Restart Write: after reset which may be done because the network is in an error condition, the receive reassembly process is started again. The Pseudo-Random Noise Sequence Detector 740 is not writing to any FIFO Buffer 750, and is looking for the first start of sequence bit. When this is seen (5), FIFO Buffer 750 writes start. When N first FIFO buffer writes have been done, coherence has been achieved.

As illustrated in FIG. 7, when the first write operation is done into the FIFO Buffer of the last E1/J1 line to see a pseudo-random noise start of sequence bit, a Counter 760 is triggered. The Counter runs for one frame time. When this counter matures, output data reads from all N elastic buffers start simultaneously. This delay operation ensures that there is at least one full frame of data in the shortest elastic buffer before reading starts. This ensures that for any jitter/wander excursion of the links, and the mechanism does not underflow.

Implementation

In FIG. 2, an overview is shown of the disassembling and reassembling. Only the implementation for E1 lines will be detailed in the present application. However, the same principles apply to J1 or to other similar lines also.

Disassembling System

Before dividing 210: the high bandwidth data stream (TxData) into N low bandwidth channels 230, each of the N channels 230 must have achieved frame synchronization from the E1 framing units 730 on the receive data.

Figure 5:
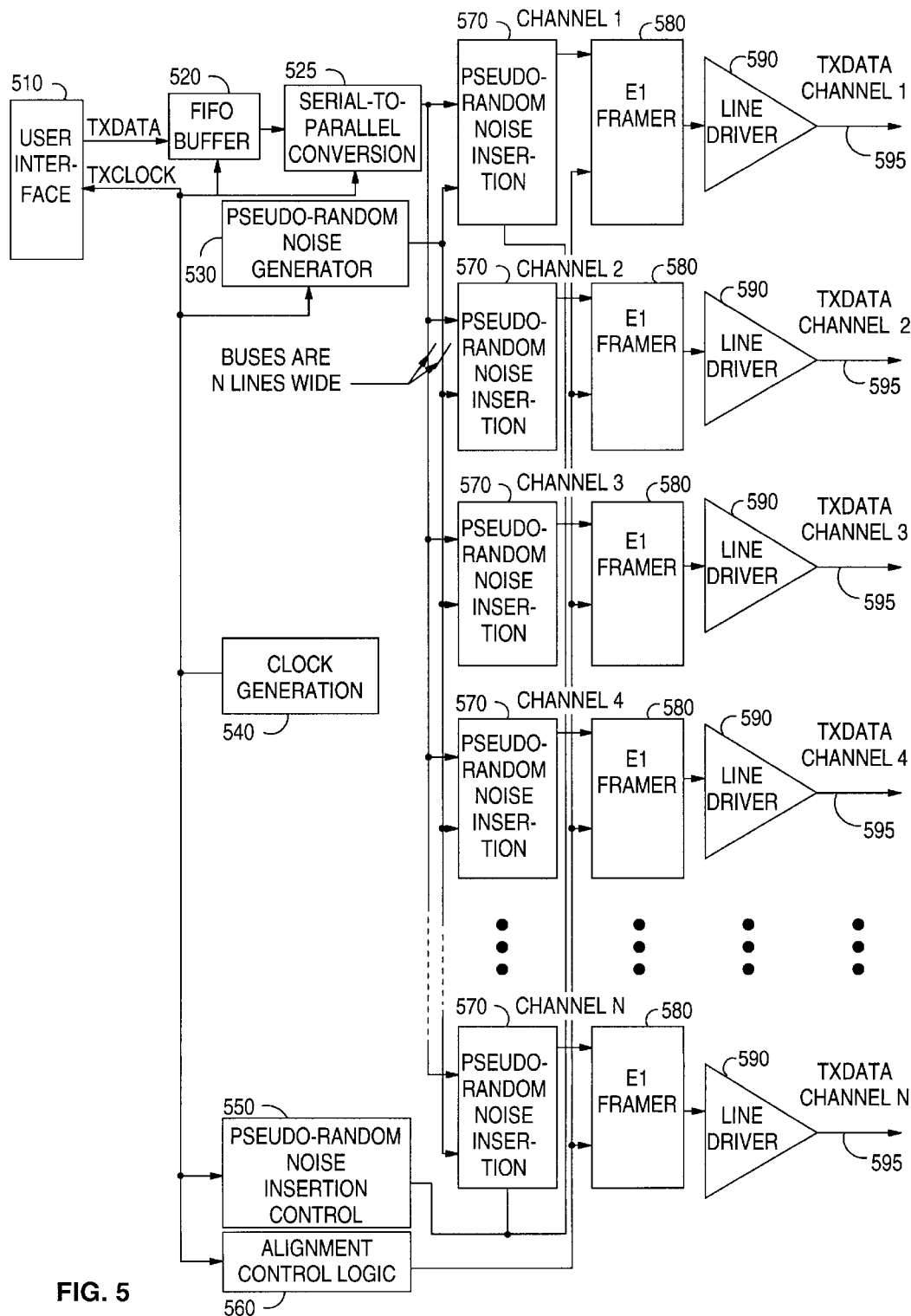
FIG. 5 is a block diagram of a transmit disassembling system according to the present invention.

FIG. 5 details the disassembling system:

Clock Generation 540: A Clock Generation unit generates a high speed clock (TxClock) with a frequency exact multiple of the low speed E1 clock received from one of the lines. The high speed clock is provided to a user interface called High Speed Serial Interface (HSSI) port 510 for clocking data into the network.

Elastic Buffer 520: The user's incoming data (TxData) enters in bit-serial form on the High Speed Serial Interface port 510 into an FIFO Buffer 520 to compensate for slight variations in clocking.

Serial-to-Parallel Converter 525: Then, the user's data is fed into a Serial-to-Parallel Converter 525 having an N-bit output. The value of N is equal to the number of E1 lines over which the incoming data is transmitted through the network, and hence the bit rate multiplier. The transmitted bit rate is N×1976 kbps.

Pseudo Random Noise Insertion 570: The N bits of the Serial-to-Parallel Converter 525 output in turn form N bit serial inputs to N Pseudo Random Noise Insertion (PRNI) units 570. These PRNI units are bit multiplexors. As the data exits the Serial-to-Parallel Conversion unit 525, the high bandwidth bit stream must be divided into N lower speed bit streams. The PRNI 570 circuit accepts only one of N bits from the higher bandwidth signal. After it accepts one bit, the next PRNI unit accepts the next bit. The Pseudo-Random Noise Insertion Control 550 synchronizes the insertion of the pseudo-random noise bit 405 with the framing pattern 440 in the data stream.

Transmit Pseudo Random Noise Insertion Control Logic 550: The Pseudo Random Noise Insertion 570 units are operating under the common control of the Transmit Pseudo Random Noise Insertion Control Logic 550.

E1 Framers 580: The outputs of the Pseudo Random Noise Insertion units 570, in turn, are using as inputs to E1 Framers 580.

Alignment Control Logic 560: The Alignment Control Logic 560 maintains the pseudo random noise sequence bit 405 and determines the bit ordering positions within the frame shown in FIG. 4. This Alignment Control Logic 560 ensures that the E1 Framer 580 inserts eight bits 440 into each 256-bit frame for framing synchronization.

Pseudo Random Noise Generator 530: Of the 248 bits remaining per E1 frame entering the E1 Framer, 247 are data from the incoming data, and one bit is used by the PRNI unit 570 from the Pseudo Random Noise Generator 530. There is one Pseudo Random Noise Generator 530, and its output is added at a common time into all N data streams. Timing is such that the bit from the PRNI generator 530 is inserted into the first bit position of the first slot 405 on a E1 frame following the framing bit in each E1 frame.

Line Drivers 590: The Line Drivers 590 are CCITT compliant circuits that place the bit stream in the network 595.

In this manner an identical superframe signal is added into each of the N channels 595, in exactly the same bit position in the E1 frame. This information is used to cohere the received signal.

Disassembling Process

Figure 6:
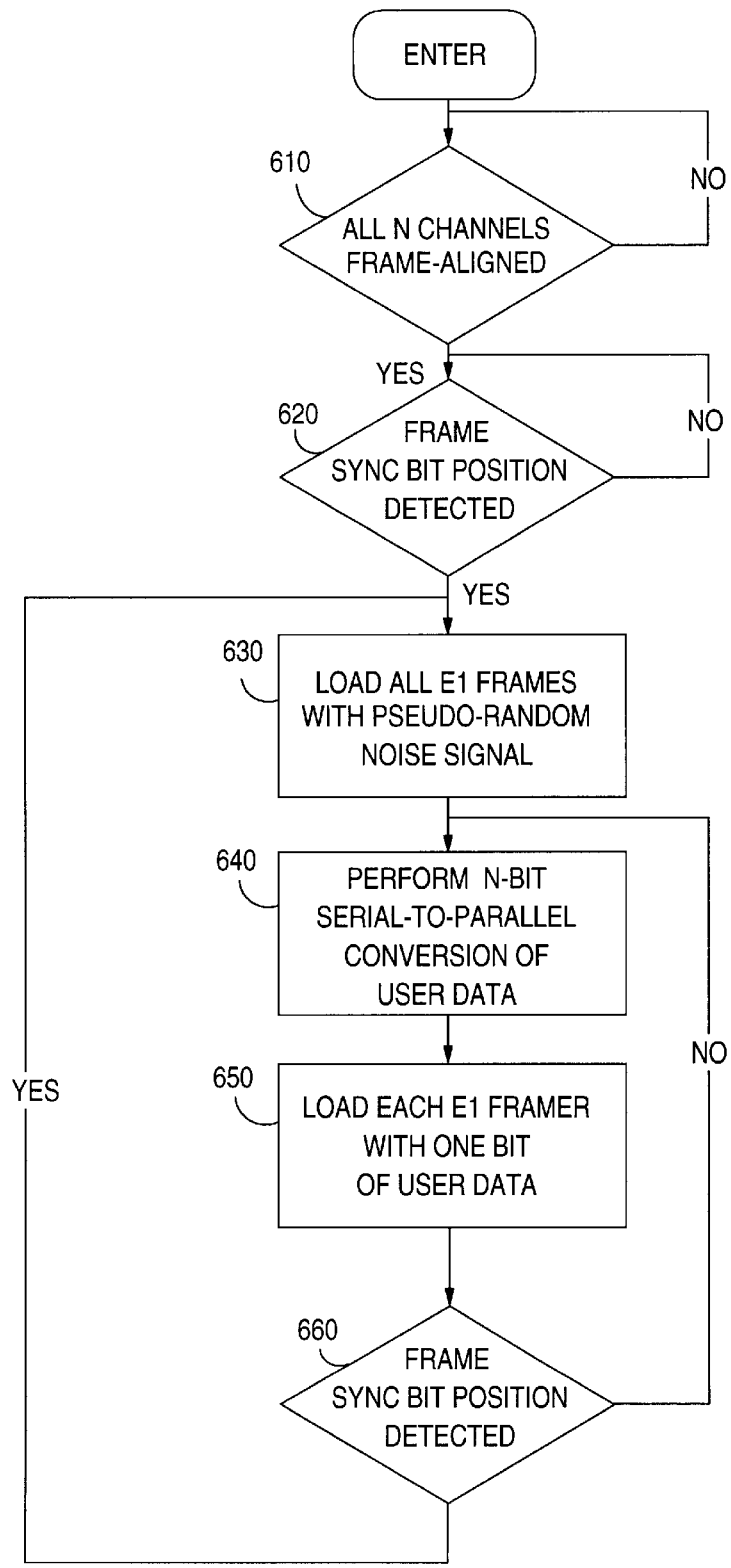
FIG. 6 is a flow diagram of the transmit disassembling process of FIG. 5.

FIG. 6 shows the process for disassembling the high bandwidth user's data in the transmit direction:

Step 610 determines if all the N channels have obtained frame alignment by detection of the frame alignment sequence pattern from the network data stream in the frame and superframe patterns 440.

Once frame alignment has been detected, step 620 searches for the frame synchronization bit 440. The frame synchronization bit starts the initial process of disassembling for the high speed data.

Once the frame synchronization bit is detected, step 630 loads all the E1 Framers 580 with the pseudo-random noise bit 405 provided by the Pseudo Random Noise Insertion unit 570 and the Pseudo Random Noise Generator 530 so the transmitted signal has a common point of reference.

Step 640 performs the serial to N-bit parallel conversion 525 of the data as it is passed to the E1 framers 580.

Step 650 loads one bit of user data in the framer (580) and then performs a test.

Step 660 determines if the next bit is going to be the frame synchronization bit denoting the start of a new frame.

If no frame synchronization bit is required then steps 640 and 650 are executed in a loop until the synchronization bit is detected.

Once step 660 detects the synchronization bit then control is passed to step 630.

In step 630 the pseudo-random noise bit is inserted in the data stream and the process is repeated.

If at any time the signal is lost or frame synchronization disappears because of a network problem, the control passes back to steps 610 and 620 so the synchronization and alignment process can start over.

Reassembling System

The reassembling system is detailed in FIG. 7:

Receiver 710: The signal RxData transmitted along each E1 channel 705 is received 710 at its destination point.

Clock and Data Recovery 720: The user's data and the clock are recovered 720 from the received analog E1 signal.

E1 Framer 730: Each analog E1 signal is converted to digital levels and processed by a E1 Framer 730, one for each line. The recovered clocks are used by the E1 Framers in the reassembling and delay compensation process. The E1 framers search the incoming data stream for the frame alignment sequence that is used to determine the relative positions of the data bits being received as shown in FIG. 4. E1 framing is done by commercially available E1 Framer devices 730 which use the E1 framing signal contained in the eight bits of each E1 frame 440. The E1 Framer output contains 247 data bits (out of the 248 bits remaining) for each received E1 frame.

Pseudo Random Noise Sequence Detections 740: At the receiver side, the N independent E1 channels 705 contain an embedded pseudo-random noise sequence 405 along with the data. Because of the different physical paths that each signal traversed, the delay of the received data varies between received signals. Therefore, there must be some circuitry added to compensate for this delay. On every E1 channel 705 a Pseudo Random Noise Sequence Detection unit 740 searches for the delay of the pseudo-random noise sequence 405 from each incoming signal. Delay is measured in the number of data bits between the pseudo-random noise bit among each data stream. (See FIG. 8 for an example). This sequence of 511 bits is found in the first bit position following the E1 framing slot of every E1 signal 405.

Figure 8:
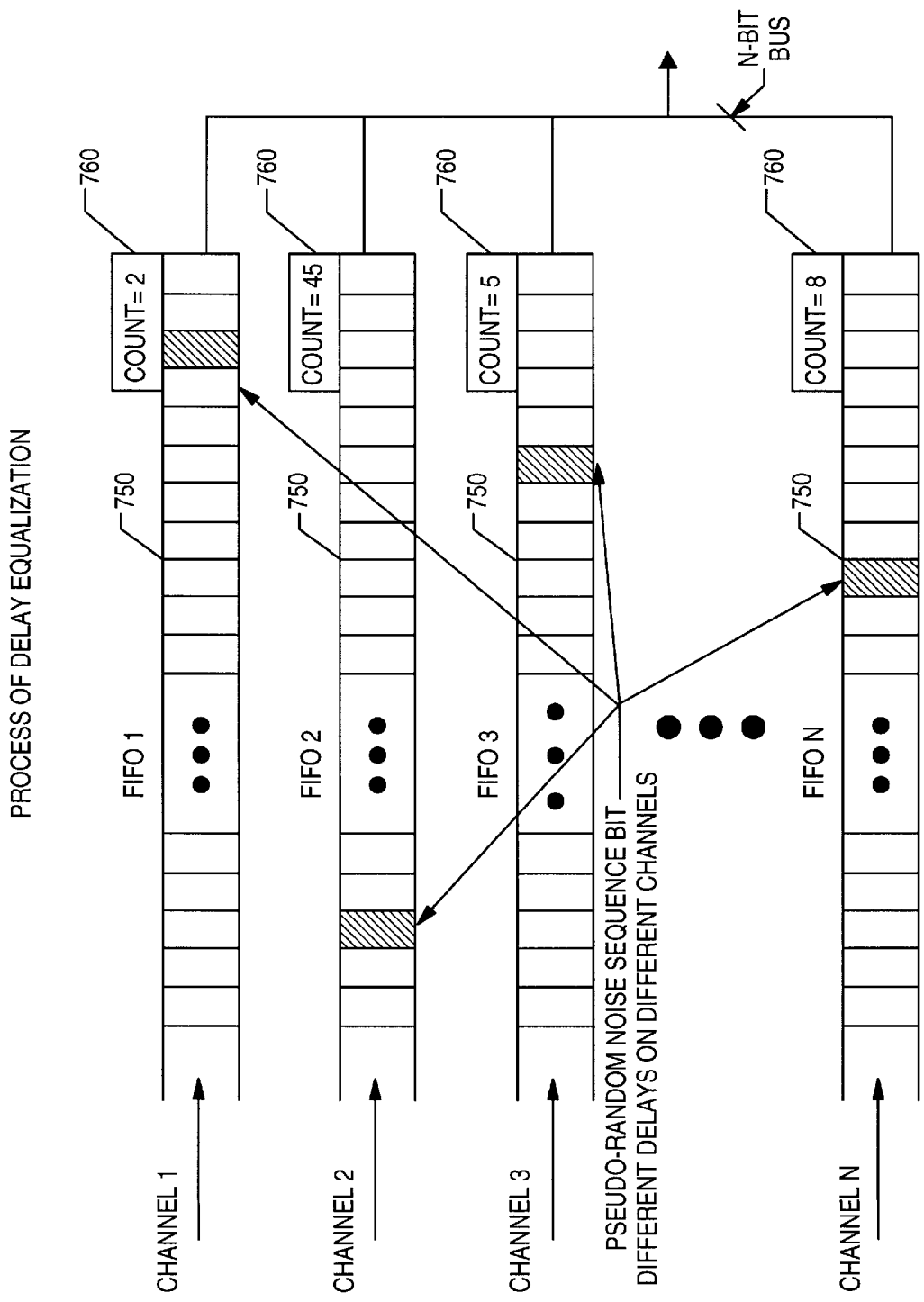
FIG. 8 is a timing diagram for a delay equalization process according to the present invention.

Delay FIFO Buffer 750: Once this sequence has been founded, then writing into Delay FIFO Buffers 750 begins with the first data bit following the pseudo-random noise sequence which is defined as start of frame. In this manner the bits entering the Delay FIFO Buffers correspond to the bits which were originally associated at the transmitter. However, the bit sequence is still not aligned so that it can be reassembled into the high speed signal that was transmitted at the origin. FIG. 8 shows a snap-shot of the Delay FIFO Buffers at a given point in time in the reassembling process.

Counter 760: Each Delay FIFO Buffer 750 contains a Counter 760 that holds the number of clock cycles required to shift the pseudo-random noise sequence to the last position in the Delay FIFO Buffer.

FIG. 8 shows an example of each Delay FIFO Buffer 750 and its associated Counter 760 when all lines have detected the pseudo-random noise sequence pattern 405 in their data stream. The different counter values and the different positions of the pseudo-random noise bit are due to the different delay parameters of the data transmission over N physically separate lines. For the high bandwidth signal to be reassembled this delay must be compensated for by the invention.

Group Alignment Control Logic 790: The Group Alignment Control Logic 790 ensures that the N Pseudo Random Noise Sequence Detection units 740 have detected the pseudo-random noise sequence and are "locked" onto that repeating pattern. Now, one of two events occur:

Either all N Pseudo Random Noise Sequence Detection units 740 lock onto this sequence before any Delay FIFO Buffer 750 overflows, or one Delay FIFO Buffer 750 overflows prior to all Detection units finding the pseudo-random noise sequence.

Hence, if the Pseudo random Noise Sequence Detection unit 740 happens to lock onto the pseudo-random noise sequence to one of those signals with most delay, the one with the least delay causes a Delay FIFO Buffer 750 overflow. In this case, all Delay FIFO Buffers are reset (cleared), and writing to the Delay FIFO Buffers starts with the next line to see start of pseudo-random noise sequence. This event occurs on about half of the cohering events, but only occurs once. The cohering attempt following the reset always works. Based on the Pseudo-Random Noise Sequence Counters 760, the Delay FIFO Buffers' data is clocked out until the outputs of all the Delay FIFO Buffers contain the pseudo-random noise sequence at their output (FIG. 8 and FIGS. 9a, 9b).

FIG. 8 depicts the contents of the Delay FIFO Buffers 750 and the Pseudo-Random Noise Sequence Counters 760 when the pseudo-random noise sequence has been detected by all channels.

Figure 9B:
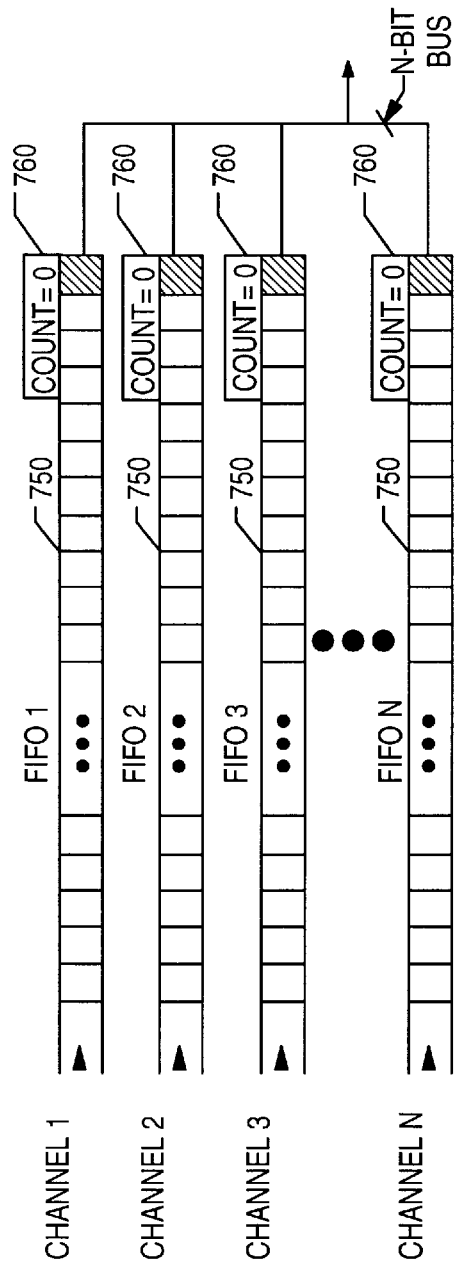

FIGS. 9a and 9b depict the method for compensating for the different delays in the channels. The object of the delay compensation is to ensure that the pseudo-random noise bit (405) is the first bit in the FIFO Buffer 750 before the data is combined into the higher bandwidth signal. In FIG. 8 the pseudo-random noise bit is two bit positions from the beginning of the FIFO for Channel 1, 45 bit positions for Channel 2, 5 bit positions for Channel 3, ... 8 bit positions for Channel N. After two clock pulses, the pseudo random noise bit 405 is at the beginning of the FIFO Buffer 750 for Channel 1, but not at the beginning for the other Channels. Therefore, the output of the Delay FIFO Buffer (750) for Channel 1 is not clocked while the other Channels' outputs are clocked. Even though the output of Channel 1 is not clocked, the input is clocked since the data is still being received. As stated earlier 32,768 bits (20.3 msec) of data can be received while the other Delay FIFO Buffers (750) are in the process of delay compensation. Continuing with FIG. 9, seven clock pulses later Channel 3 has the pseudo-random noise bit 405 at the beginning of the Delay FIFO Buffer 750. Forty-five clock pulses after all the Pseudo-Random Noise Detection Units 740. have detected the pseudo random noise sequence, all the Delay FIFO Buffers 750 have the pseudo random noise bit at the output and are ready to reassemble the data into a higher bandwidth data stream.

Delay FIFO Buffers 750 in which the pseudo-random noise sequence bit 405 arrives prior to the others simply do not receive a clock signal to shift the data out. Therefore, the delay compensation time is equal to the value of the highest counter times the clock bit rate. However, because the Delay FIFO Buffers 750 are elastic buffers, data is continually loaded while this compensation occurs.

Parallel-to-Serial Conversion 770: Once the delay compensation occurs, the outputs of the N Delay FIFO Buffers 750 are read out as an N bit word, reflecting the way they were written in on the transmit side. This word is then converted to bit-serial format and sent out the transmit side of the HSSI port.

Reassembling Process

FIGS. 10a and 10b show the process for reassembling the user's data after reception:

Steps 161 and 162 show the initial process for obtaining both frame alignment and the frame synchronization pattern 440 across all the receive lines. This process is similar to the process for the transmit disassembling process.

Step 163 analyzes the result of the Pseudo Random Noise Sequence Detection units 740 for all the received signals.

Once all signals have been detected by the Group Alignment Control Logic 790 as shown by a positive response to step 164, the Counters 760 are loaded by step 165 with the number of cycles from the detection of the framing bit. This Counter 760 for each line holds the delay value for that channel.

Bits are now clocked out of the Delay FIFO Buffer 750 by step 166.

Step 167 tests the Counter 760 for a zero value indicating that the pseudo-random noise signal bit 405 is now at the head of the Delay FIFO Buffer. Of course some Delay FIFO Buffers will have the pseudo-random noise signal bit at the head of the Delay FIFO Buffer before the others. In this case step 167 is exited with a positive response and step (168) prevents this bit from being clocked out of the Delay FIFO Buffer 750. FIG. 9 described the sequence of events related to this process.

Step 169 uses the output of the Group Alignment Control Logic 790 to determine when all the pseudo-random noise signals are at the head of the Delay FIFO Buffer 750. When this occurs, the signal is now ready to be reassembled into an N-times bandwidth signal.

Step 170 sets the signal (RxReady) in the Group Alignment Control Logic 790 to the HSSI interface and the data is received and reassembled by step 770.

The remaining steps 171, 172, and 173 monitor for any error conditions that may occur within the carrier network. Error conditions that do occur cause the state machine to return to the appropriate state and begin the process once again.

SUMMARY

In the telecommunications environment the method claimed in the present application allows the combination of multiple low speed channels into a single high speed channel of N-times the bandwidth available using a single low-speed channel (N is the number of separate physical lines). The user effectively sees N-times the bandwidth available for his application. The present system and method disassembles the high speed user data to be transmitted on the lower speed physical telecommunications lines and then reassembles the data at the receiving end into a coherent high speed data stream by equalizing the delay across the multiple transmission paths. Users employing this technique are not required to buy the next available tariffed service if their application exceeds the bandwidth requirements of one low speed physical telecommunications line. Fractional high bandwidth channels are created to suit an individual user's requirement with a small amount of overhead to compensate for the different line delays and without impacting the currently installed telecommunications equipment. Resources are thereby efficiently used within the network and communication costs are reduced. The present method of disassembly and reassembly is not limited to terrestrial transmission of signals. I.e., and may be employed using satellites. The method compensates for data streams travelling different physical routes through the network.

While the present invention has been described in terms of a preferred embodiment, various changes may be made in the embodiment without departing from the spirit and scope of the invention as defined in the appended claims.

We claim:

1. A method in a communication network for assembling a relatively high bandwidth data stream from a plurality of relatively low bandwidth data streams each having a plurality of data frames, which are received from a respective plurality of relatively low bandwidth telecommunications channels, comprising the steps of:

(a) equalizing transmission time delay among said plurality of low bandwidth data streams by equalizing time delay among the associated plurality of low bandwidth telecommunications channels;

wherein said equalizing step comprises the steps of:

(i) receiving a plurality of data frames concurrently transmitted across each of said low bandwidth channels;

(ii) extracting an alignment signal concurrently inserted in each corresponding data frame of each of said low bandwidth data streams, said alignment signal being a pseudo-random noise bit, said bit being in the same bit position in each data frame and in particular in the first bit position;

(iii) detecting a pre-determined alignment pattern in each of said plurality of low bandwidth data streams, said pre-determined alignment pattern being made up of consecutive alignment signals in data frames of each of said plurality of low bandwidth datastreams;

(iv) measuring time delay differences among said detected pre-determined alignment patterns at each of said low bandwidth channels;

(v) adding time delay to each low bandwidth channel corresponding to the measured time delay difference for the associated low bandwidth channel; and (b) combining the plurality of time delay equalized datastreams into a single high bandwidth datastream.

2. The method of claim 1 wherein the alignment pattern is repeatedly and concurrently inserted into each of said low bandwidth datastreams.

3. The method of claim 2 wherein the alignment pattern has a length of at least twice a maximum anticipated transmission time delay difference across said plurality of low bandwidth channels.

4. The method of claim 3 further comprising the step of: determining if all data streams have obtained frame alignment by detection of the alignment pattern from the network data stream in frame and superframe patterns.

5. The method of claim 4 further comprising the step of: searching for a frame synchronization bit after all data streams have been aligned.

6. The method of claim 5 wherein each of said low bandwidth telecommunication channel comprises a data communication channel and wherein said step of inserting an alignment signal comprises the further step of concurrently inserting a channel frame synchronization pattern in each of said channels.

7. The method of claim 6 wherein each of said low bandwidth telecommunication channel comprises a data communication channel and the further step of counting and holding the delay value in each of said channels.

8. A system for disassembling a relatively high bandwidth datastream into a plurality of relatively low bandwidth datastreams, each data stream having a plurality of data frames, and recombining the plurality of low bandwidth data streams into the high bandwidth data stream for rate serving purposes on a communication network, comprising:

means for inserting an alignment signal into each corresponding data frame of each of said low bandwidth datastreams, said alignment signal being a pseudo-random noise bit, said bit being in the same bit position in each data frame and in particular in the first bit position, the consecutive alignment signals in data frames of each of said low bandwidth data streams constituting a predetermined alignment pattern;

means for transmitting a respective one of said low bandwidth datastreams, including the concurrently inserted alignment signal on a respective one of said low bandwidth channels;

means for equalizing transmission time delay among said plurality of low bandwidth datastreams by equalizing time delay among the associated plurality of low bandwidth telecommunications channels;

means for combining the plurality of time delay equalized datastreams into the single high bandwidth datastream;

means for extracting the alignment signal concurrently inserted in each corresponding data frame of each of said low bandwidth datastreams;

means for detecting a predetermined alignment pattern in each of said plurality of low bandwidth datastreams, said predetermined alignment pattern being made up of consecutive alignment signals in data frames of each of said plurality of low bandwidth datastreams;

means for measuring time delay differences among said detected predetermined alignment patterns at each of said low bandwidth channels; and means for adding time delay to each low bandwidth channel corresponding to the measured time delay difference for the associated low bandwidth channel.

9. The system of claim 8 wherein the alignment pattern has a length of at least twice a maximum anticipated transmission time delay difference across said plurality of low bandwidth channels.

10. The system of claim 9 further comprising means for clocking a delay buffer on each low bandwidth channel until all buffers contain the pseudo-random noise bit at their respective outputs.

11. The system of claim 10 further comprising means for compensating for the different delays in the low bandwidth channels.

* * * * *